(12) United States Patent  
Phinney

(10) Patent No.: US 9,393,890 B2  
(45) Date of Patent: Jul. 19, 2016

(54) AISLE-OPERATED LOCKING MECHANISM FOR MOVABLE SEAT

(71) Applicant: American Seating Company, Grand Rapids, MI (US)

(72) Inventor: Randy P. Phinney, Grant, MI (US)

(73) Assignee: American Seating Company, Grand Rapids, MI (US)

( * ) Notice: Subject to any disclaimer, the term of this patent is extended or adjusted under 35 U.S.C. 154(b) by 0 days.

(21) Appl. No.: 14/208,062

(22) Filed: Mar. 13, 2014

(65) Prior Publication Data

US 2014/0265516 A1    Sep. 18, 2014

Related U.S. Application Data

(60) Provisional application No. 61/793,019, filed on Mar. 15, 2013.

(51) Int. Cl.
| | |
|---|---|
| *B60N 2/44* | (2006.01) |
| *B60N 2/02* | (2006.01) |
| *B60N 2/24* | (2006.01) |
| *B60N 2/015* | (2006.01) |
| *B60N 2/08* | (2006.01) |

(52) U.S. Cl.
CPC ............ *B60N 2/442* (2013.01); *B60N 2/01516* (2013.01); *B60N 2/01575* (2013.01); *B60N 2/08* (2013.01); *B60N 2/0806* (2013.01); *B60N 2/0887* (2013.01)

(58) Field of Classification Search
CPC ...... B60N 2/0806; B60N 2/08; B60N 2/0887; B60N 2/442; B60N 2/01516; B60N 2/01575
USPC .......................... 297/344.1, 463.1; 296/65.13
See application file for complete search history.

(56) References Cited

U.S. PATENT DOCUMENTS

| | | | | |
|---|---|---|---|---|
| 1,752,368 | A  * | 4/1930 | Brunn ................... | B60N 2/072 297/344.1 |
| 5,156,438 | A | 10/1992 | Hayakawa et al. | |
| 5,529,378 | A  * | 6/1996 | Chaban .............. | B60N 2/01508 297/331 |
| 7,708,331 | B2 * | 5/2010 | Yamasaki .............. | B60N 2/062 296/65.11 |
| 8,573,674 | B2 * | 11/2013 | Otsuka ................. | B60N 2/0715 296/65.09 |

* cited by examiner

*Primary Examiner* — Milton Nelson, Jr.
(74) *Attorney, Agent, or Firm* — Clark & Brody

(57) ABSTRACT

A movable seat for a transit vehicle has a folding seat cushion that moves between a use position oriented to support a passenger and a storage position. The seat is supported by at least one pedestal that can be mounted in a vehicle for movement with respect to the vehicle, for example to provide space for a mobility aid. The pedestal has a locking mechanism and a lock activator that places the locking mechanism in a locked position to prevent movement of the seat. The seat also has a release mechanism that in one orientation maintains the locking mechanism in a locked position and in a second orientation unlocks the locking mechanism and also prevents placement of the folding seat cushion to the use position when unlocked.

7 Claims, 6 Drawing Sheets

AISLE-OPERATED LOCKING MECHANISM FOR MOVABLE SEAT

TECHNICAL FIELD

This invention relates to the art of transportation seating and in particular to locking mechanisms for movable seats in mass transit vehicles.

BACKGROUND

Movable seats are in common use in mass transportation. These seats are typically mounted on parallel rails, or tracks, which allows them to be moved to change their spacing, with one objective being to open an area large enough to receive a mobility aid used by non-ambulatory passengers. In the typical arrangement, two or more seats are moved to locations where they are quite close to each other or to other seats so that the mobility aid area will be as large as possible by movement of as few seats as possible. The movable seats are generally provided with flip-up seat bottoms to allow those seats to be moved to locations as close as possible to the adjacent seat in front.

Known seats are also often provided with a locking mechanism that secures the seat to the seat rails at predetermined locations. These locking mechanisms often include locking plungers that move vertically to engage either holes or gaps between adjacent physical stops within the rails to lock the seat in place. The seat is unlocked by operating the mechanism to lift the locking shafts out of the holes or gaps. A typical seat is supported on two pedestals, and each pedestal has a vertically movable locking plunger that is operated by a user handle located between the pedestals or at each pedestal.

One disadvantage of the known locking mechanisms is that locating the user's handle between the pedestals or at a pedestal frequently means that it is not easily accessible when the seats have been moved close to each other, because one seat is then so close to the seat in front that the operator cannot access the handle. Another disadvantage of the known mechanisms is that they can be operated and the seat bottom used by a passenger regardless of whether the seat has been locked into the use position. Therefore, it is possible that the seat might be used when unlocked. Thus, there is a need for a seat locking mechanism that is more easily approached by the user and eliminates operator confusion regarding the position of the seat bottom.

SUMMARY OF THE INVENTION

In accordance with the invention a seat for a public transit bus and particularly useful for a motor coach provides a unique latching mechanism that interlocks with the seat cushions to prevent occupant use when the seat is unlocked by preventing the cushion from being folded down when the seat is unlocked.

In an embodiment, a mechanism allows actuation of locking mechanisms on both inboard and outboard pedestals by operation of a single release mechanism and a single lock activator, which are both easily accessed by the operator from the aisle of the vehicle.

DETAILED DESCRIPTION OF THE PREFERRED EMBODIMENT

Figure 1:
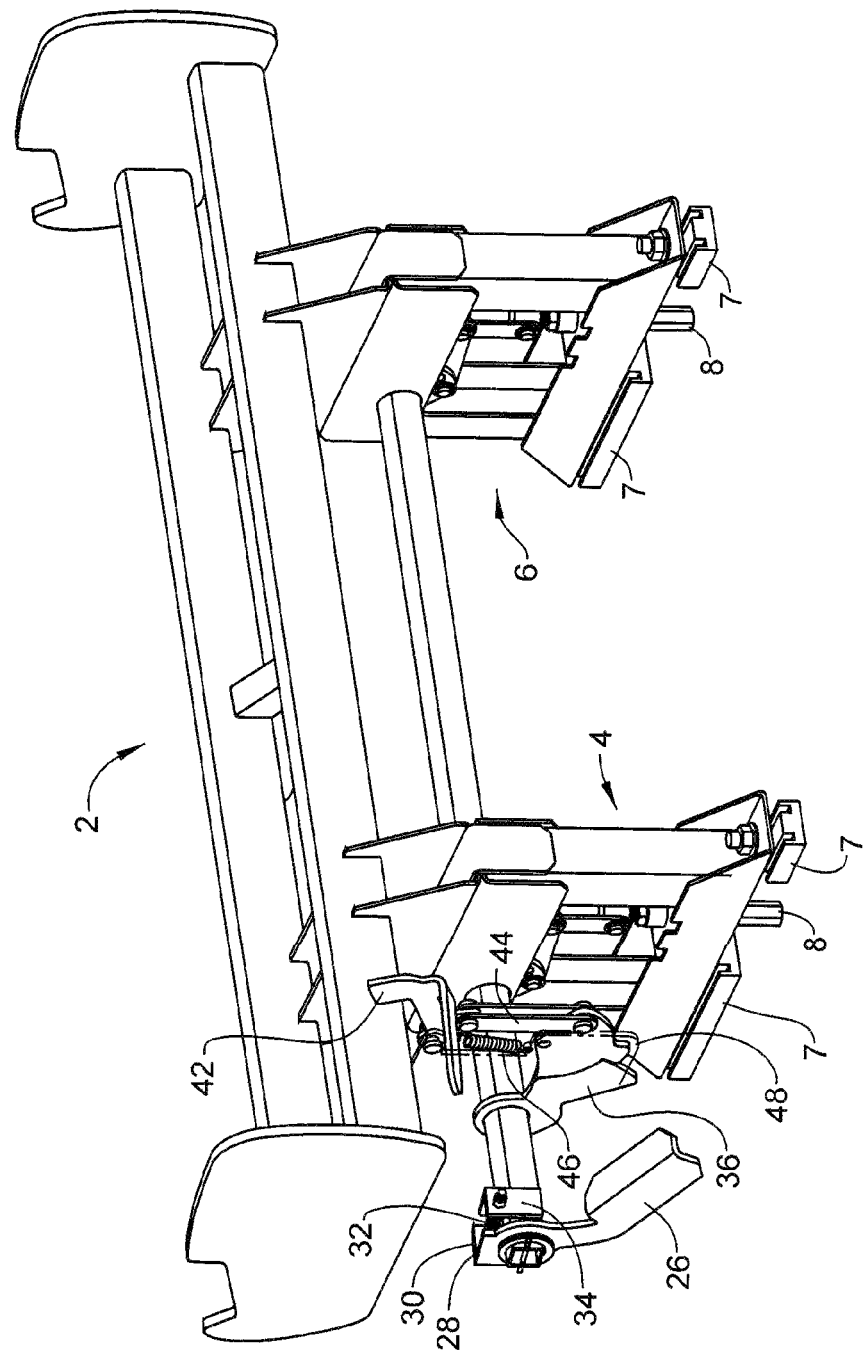
FIG. 1 is a perspective of a seat frame having a locking mechanism in accordance with the invention.

With reference to FIG. 1, a seat frame 2 is configured to support a seat back and seat cushions, which have not been shown for purposes of illustrating the mechanisms of the invention. It will be appreciated however, that the seat back and cushions are those that are known in the art of seats, and in particular movable seats where the seat cushions can be folded up to allow the seat to be placed close to a seat directly in front or to be moved rearward with the seat cushion folded up to provide space for receiving a mobility aid.

The seat frame of FIG. 1 includes pedestals 4 and 6, which engage rails or tracks 7 to mount the seat on the rail in a vehicle and permit movement of the seat in the direction of the rails. Each of the pedestals has a plunger 8 that is vertically movable in a bushing 9 in the pedestal to engage a recess, or the like, in a rail to lock the position of the seat. The seat is unlocked and movable when the plungers 8 are raised. The locked and unlocked positions are illustrated in FIGS. 3 and 4.

Figure 3:
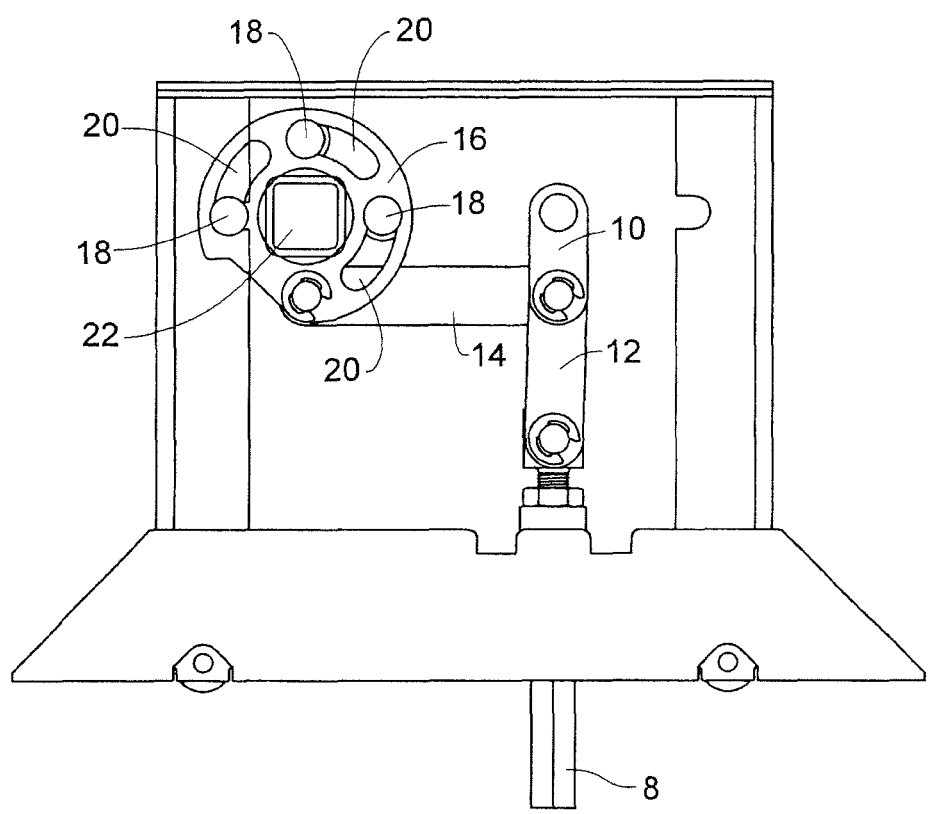
FIG. 3 is a partial side view of a seat support pedestal showing a portion of the locking mechanism attached to a vertical plunger in the locked position.
Figure 4:
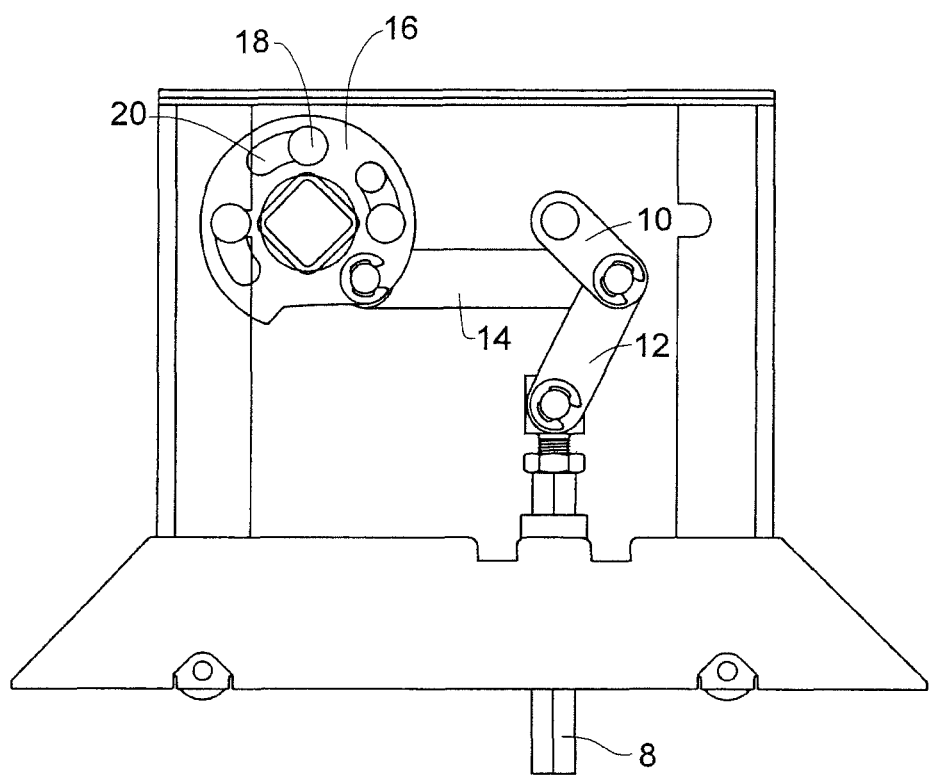
FIG. 4 is a partial side view of a seat support pedestal showing a portion of the locking mechanism attached to a vertical plunger in the unlocked position.

With reference to FIGS. 3 and 4, it will be seen that the locked or unlocked position of the plungers 8 is controlled by a linkage comprised of links 10, 12, and 14. Link 10 is pivotally connected to the pedestal at one end and to links 12 and 14 at the other. Link 12 is connected to the plunger at the end opposite link 10. Link 14 is connected to a disk 16 at its end opposite the links 10 and 12. The disk 16 is mounted to the pedestal by pins 18 which engage in respective slots 20 to allow rotation of the disk.

The disk receives a shaft 22 through its center, and rotation of the shaft will rotate the disk, which in turn will move the link 14 to raise or lower the plunger 8 to lock or unlock the seat from the rails.

Figure 2:
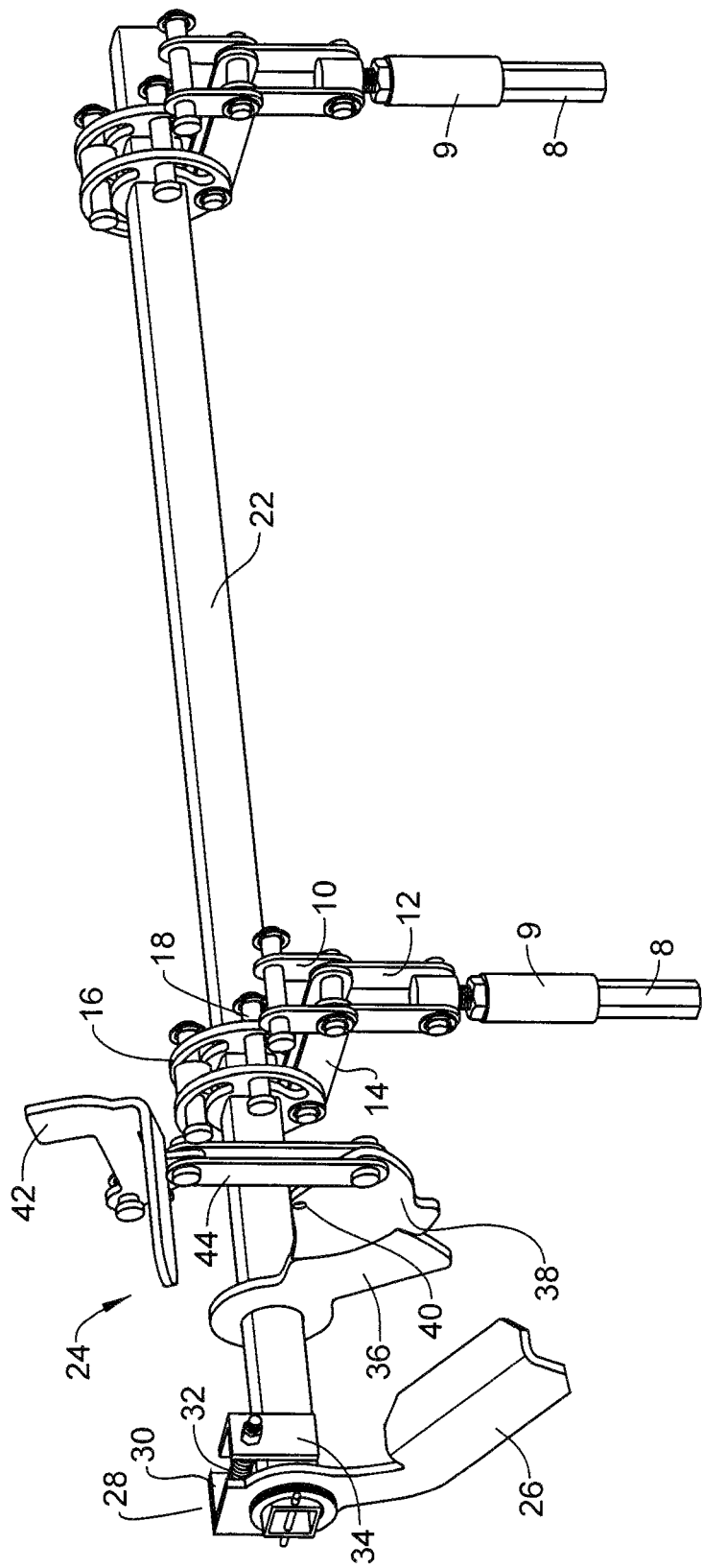
FIG. 2 is a perspective of the locking mechanism of the invention.

The locking mechanism includes a release handle 24 and a locking lever 26. Locking lever 26 can be operated by a user's foot to rotate the shaft 22. Preferably, the lever 26 is attached to the shaft by a spring overload protector 28. The spring overload operates by mounting the lever 26 to the shaft for free rotation about the shaft and connection of an upper end 30 of the shaft to a spring 32 that is also connected to an abutment 34 fixed to shaft 22. Downward application of pressure to the lever 26 applies a force to the abutment 34 through the spring. In the ordinary situation this will rotate the shaft 22 clockwise in FIG. 2. But if the shaft is prevented from rotation, as when the seat is not in a proper locking position the plunger 8 will not move downward, and excessive force (e.g., >50 pounds) on the lever 26 will be absorbed in the spring 30 to prevent damage to the mechanism. Optionally, the overload system may be eliminated and the component parts made strong enough to sustain the applied forces.

Figure 5:
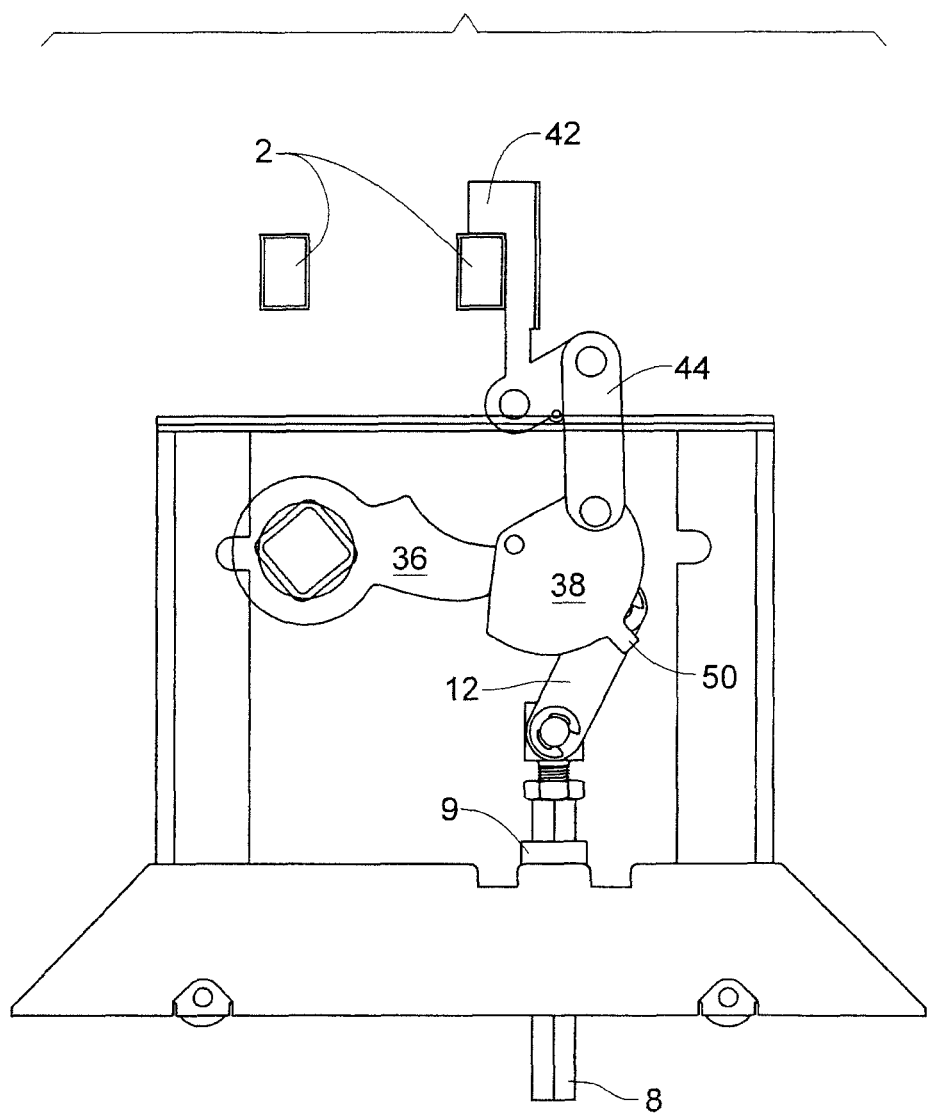
FIG. 5 is a partial side view of the locking mechanism at the aisle side of the seat when the lock is in the unlocked position allowing movement of the seat along mounting rails.

The release mechanism operates as follows. A plate 36 is mounted to the shaft 22 for rotation therewith. A locking plate 38 is mounted to the seat frame at pivot point 40 and is also connected to a release lever 42 via links 44. When the release lever 42 is lifted from the position shown in FIGS. 1, 2, and 6, links 44 lift up on the locking plate 38 to release the plate from a locked position. Preferably, the shaft 22 is spring biased toward the unlocked position so that when an operator lifts the release lever 42 the shaft 22 automatically rotates to the unlocked position, unlocking the lock and allowing the seat to move as shown in FIG. 5. Because the release lever must be lifted to unlock the seats, the seat cushions must already have been raised, thus preventing unlocking the seat unless the seat cushions have been raised.

To lock the seats, the user presses down on the locking lever 26, which moves the shaft and plate 36 clockwise. A spring 46 is attached between a protective stationary plate 48 (shown in phantom lines for clarity in illustrating the other elements) and the release lever 42 (see FIG. 1). Spring 46 assists in pulling the release lever 42 downward when the locking lever is depressed to lock the seat. Thus, depression of the locking lever 26 applies a force to the release lever 42 through the spring 46 pulling it downward and allowing the locking plate 38 to engage the plate 36 to lock the seat in position. This also pulls the release lever down and allows the seat cushions to be folded down to the use position. If, however, the seat is to be locked in a position closely adjacent another seat, the release lever 42 is still pulled down by the locking action but the seat cushions are prevented from moving downward by the presence of the seat in front of it or by another seat cushion locking mechanism not a part of this invention.

Figure 6:
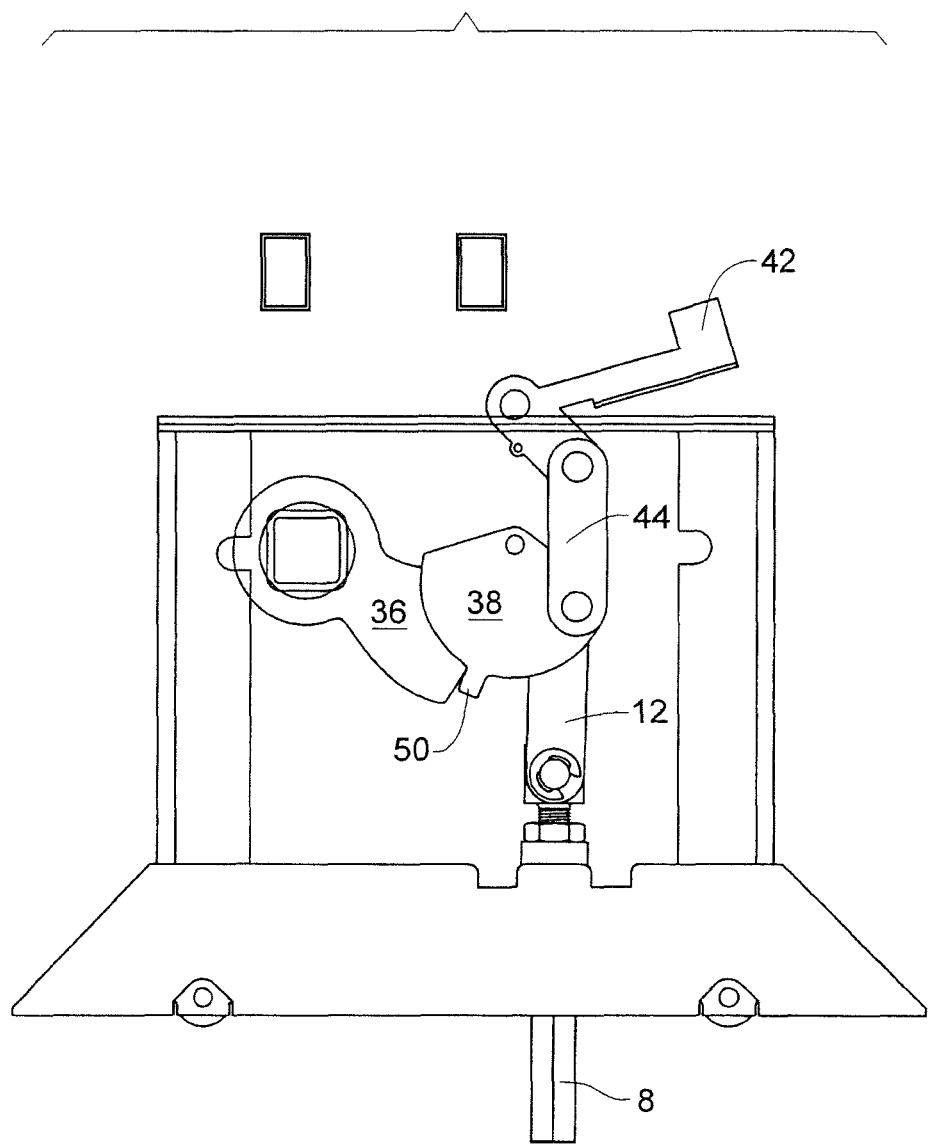
FIG. 6 is a partial side view of the locking mechanism at the aisle side of the seat when the lock is in the locked position preventing movement of the seat.

FIGS. 5 and 6 illustrate the operation of the locking plate 38. FIG. 5 illustrates the position of the locking mechanism when the seat is unlocked. In this condition, the locking plate 38 has been rotated with respect to the plate 36 to lift a locking tab 50 out of contact with the locking plate to allow the plate to move rotationally in response to rotation of the shaft 22. FIG. 6 shows the position of the elements when the release lever has been pulled downward, which engages the locking tab 50 with the end of the plate 36 to lock the plate 36 and the shaft 22 as well in place. In this position the plungers have been pressed downward, which locks the seat.

It will be appreciated that a unique mechanism has been described that allows actuation of locking mechanisms on both inboard and outboard pedestals by operation of a single release handle or a single locking lever, which are both easily accessed by the operator from the aisle of the vehicle. The mechanism also increases passenger safety by preventing the lowering of seat cushions into the use position for seating passengers until the pedestals have been locked.

While the mechanism described is operated manually, it is within the contemplation of the invention that it could be operated electrically, pneumatically, or hydraulically. As well, the locking mechanism can be operated by other than a foot and need not be located toward the bottom of the seat. Moreover, the mechanism may find application in structures other than seats, such as movable platforms.

Modifications within the scope of the appended claims will be apparent to those of skill in the art.

I claim:

1. A locking mechanism for a movable support platform, said movable support platform being configured to be mounted on a stationary structure on which said movable support platform moves, said locking mechanism comprising:
   a first lock that prevents movement of said movable support platform when in a locked position,
   a second lock operatively connected to said first lock to selectively hold said first lock in a locked position, said second lock having a release handle,
   a locking lever for operating said first lock, the release handle being operable in a first position to place the second lock in a locked condition to hold the first lock in said locked position until said release handle is moved to a second position to release the second lock to permit movement of the locking lever to place said first lock in an unlocked position, and
   a mechanism that maintains said release handle in said second position when said first lock is in said unlocked position.

2. A locking mechanism according to claim 1 in combination with a load-bearing element that is configured to move between a use position and a non-use position, said release handle being positioned to prevent movement of said load-bearing element from said non-use position when said release handle is in said second position.

3. A combination according to claim 2 wherein said load-bearing element comprises a folding seat cushion adapted for movement between a use position wherein said seat cushion is oriented to support a passenger and a storage position wherein said seat cushion is not oriented to support a passenger, and said movable support platform comprises at least one pedestal supporting said folding seat cushion, said at least one pedestal being adapted to be mounted in a vehicle for movement with respect to said vehicle.

4. A combination according to claim 2 wherein said locking lever is attached to a shaft.

5. A combination according to claim 4 comprising two pedestals, wherein each of said pedestals comprises a respective said first lock, and said shaft extends between said two pedestals to operate each said first lock.

6. A combination according to claim 5 wherein said locking lever and said release handle are positioned adjacent one of said pedestals.

7. A combination according to claim 2 wherein said movable support platform comprises two spaced pedestals, each of which supports a said first lock and one of which supports said second lock, a shaft extending between said two pedestals and connected to each said first lock, said locking lever is configured to be operated by a user's foot, and said release handle is configured to move to a generally horizontal orientation when said second lock is locked and be in a generally upright orientation when said second lock is unlocked.

* * * * *